Figure 1:
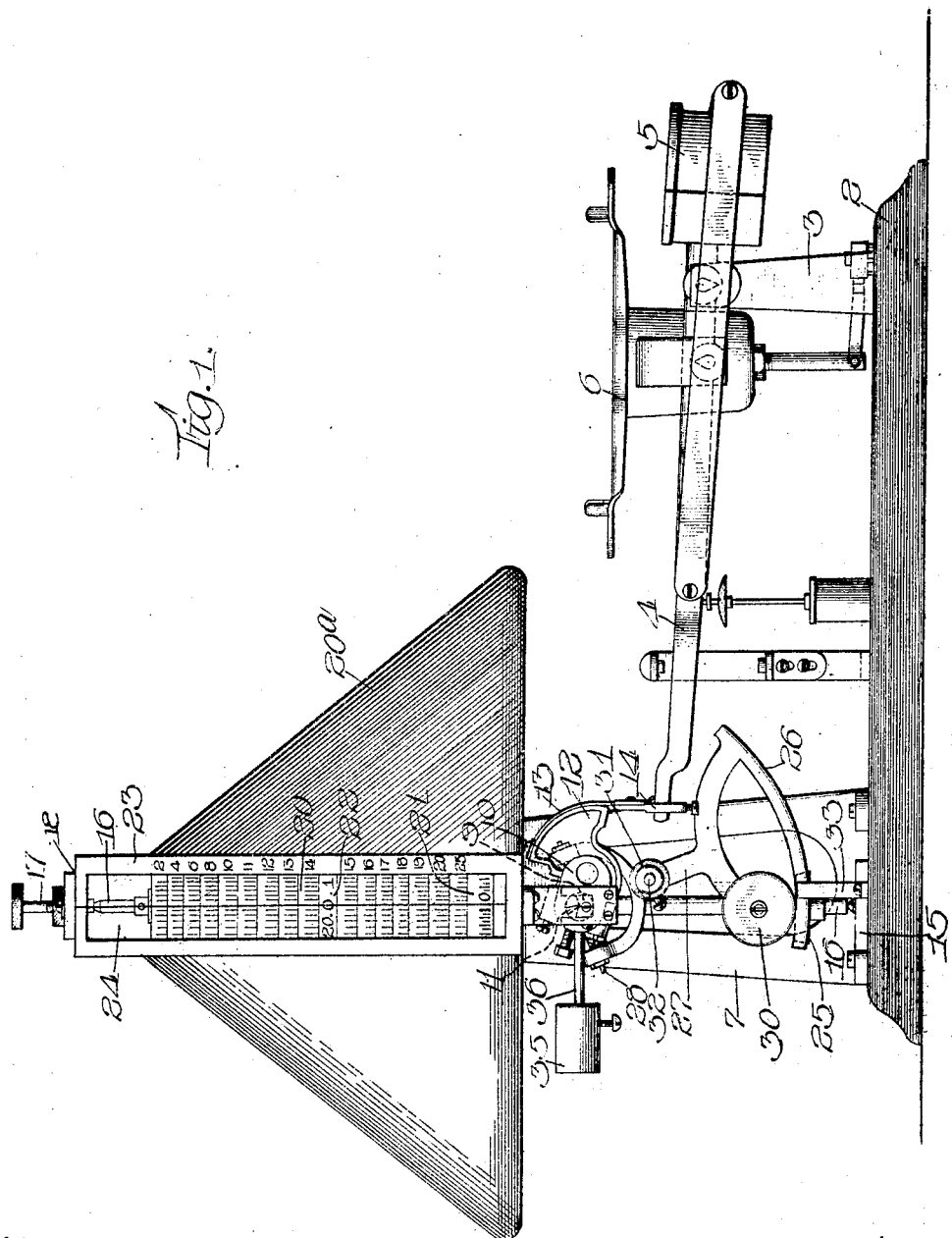

A. DE VILBISS, Jr.
WEIGHING SCALE.
APPLICATION FILED NOV. 17, 1908.

1,008,314.

Patented Nov. 14, 1911.

2 SHEETS—SHEET 1.

Witnesses:
Inventor:
Allen De Vilbiss Jr.

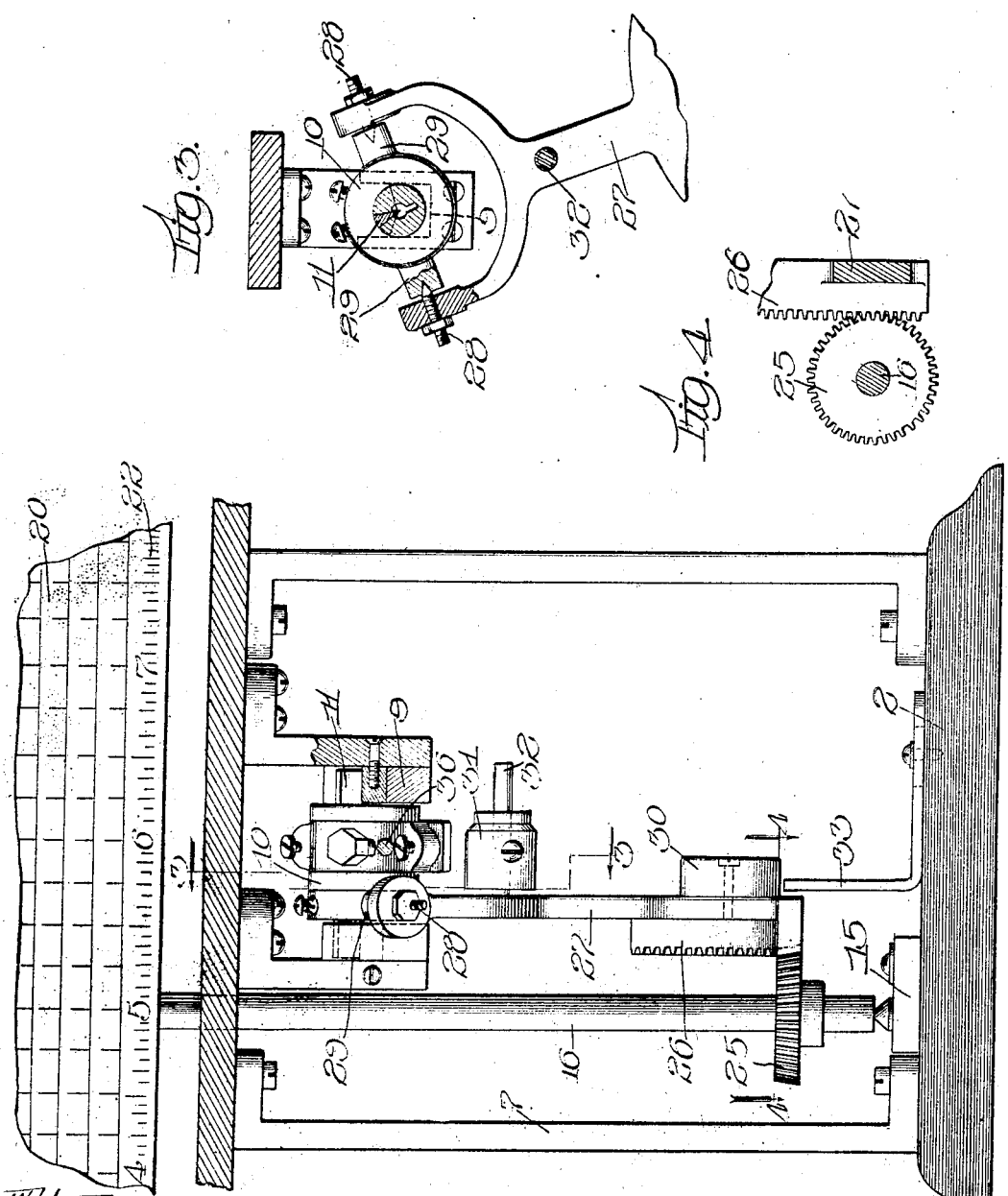

UNITED STATES PATENT OFFICE.

ALLEN DE VILBISS, JR., OF TOLEDO, OHIO, ASSIGNOR TO TOLEDO COMPUTING SCALE COMPANY, OF TOLEDO, OHIO, A CORPORATION OF NEW JERSEY.

WEIGHING-SCALE.

1,008,314.   Specification of Letters Patent.   Patented Nov. 14, 1911.

Application filed November 17, 1908. Serial No. 463,041.

*To all whom it may concern:*

Be it known that I, ALLEN DE VILBISS, Jr., a citizen of the United States, residing at Toledo, in the county of Lucas and State of Ohio, have invented certain new and useful Improvements in Weighing-Scales, of which the following is a specification.

This invention relates to that type of weighing scale in which an index journal such as a shaft supporting a conical or cylindrical weight and computation chart is geared to an oscillatory support as a rock shaft extending axially at right angles to the index journal and operatively connected to load-supporting and counter-balancing or weighing devices.

One object of the present invention is to simplify the gearing and provide for reducing the surface movement of the chart so that it can carry a greater number of computation numerals or graduations.

Another object is to apply the pendulum principle to a scale of this type in a practical manner, in which connection the invention provides for utilizing a member of the gearing to serve the purpose of a pendulum.

A further object is to provide an improved arrangement for securing a yielding engagement of the gearing which prevents lost motion and at the same time obviates undue friction.

With the above and incidental objects in view the invention consists in certain novel features of construction and combinations of parts, the essential elements whereof are recited in the appended claims and a preferred form of embodiment of which is described in detail hereinafter and fully illustrated in the accompanying drawings forming a part of this specification.

Of said drawings Figure 1 represents in elevation a scale embodying the present invention as viewed from the user's side; Fig. 2 represents an end elevation of a portion of the scale looking from the left in Fig. 1; Fig. 3 is a sectional view on an enlarged scale taken on the line 3—3 of Fig. 2; and Fig. 4 is a detail sectional view taken on the line 4—4 of Fig. 2.

The reference numeral 2 designates a suitable supporting base from which rises near one end a standard 3 supporting a scale beam 4 pivotally mounted through knife edges in the usual or any suitable manner and weighted outwardly beyond the pivot as indicated at 5. On the opposite side of the pivot the beam supports a suitable goods receiver 6. At the opposite end of the base there arises a frame 7 in the upper part of which are mounted suitable bearings 9 between which extends a rock shaft 10 having knife edges 11 resting on said bearings. This rock shaft extends horizontally and carries an eccentric sector 12 over which lies a strap or band 13 secured at the upper end to said sector and carrying at its lower end a stirrup 14 engaging the inner end of the scale beam, all as clearly shown in Fig. 1.

On a point bearing 15 on the base 2 within the frame 7 is supported the lower end of a vertical shaft 16 whose upper end is journaled in a bearing screw 17 supported by a superstructure 18 on the frame 7. There is secured to this shaft a frusto-conical chart 20 bearing circumferential rows of weight graduations and computation numerals such as commonly employed in scales of this type and also rows of weight numerals and graduations 21 and 22, one to be read by the customer and one by the user. A portion of said super-structure is in the form of a rectangular frame 23 which supports a plate 24 bearing a series of price numerals. Such plate may be transparent and marked with a reading line to intersect the rows of graduations and numerals on the chart or provision may be otherwise made for properly locating the computation numeral or graduation and the weight indication. The chart is inclosed in a casing 20ª with suitable openings to disclose the weight and computation numerals. Near its lower end said shaft 16 has secured to it a gear wheel 25 slightly beveled and there is hung from the rock shaft 10 a crown gear segment 26 correspondingly beveled and meshing with said gear wheel 25. This gear segment is cut in the flange of an arm 27 which is bifurcated at its upper end as more clearly shown in Fig. 3 to support bearing screws 28 which engage sockets in lugs 29 on the rock shaft 10 projecting therefrom at diametrically opposite points. The arm 27 at one end of its widened lower portion carries a weight 30 for the purpose of constituting such arm a pendulum. Thus the weight normally swings the arm to the right as the scale is seen in Fig. 1, correspondingly swinging the sector 12 and holding up the inner end of the beam 4 and consequently holding up the goods receiver. It is obvious that, the scale being assumed in normal equilibrium, a load placed on the goods receiver will lower the inner arm of the beam and swing the pendulum until equilibrium is again established by reason of the increasing counterbalancing effect of the pendulum weight. Thus an effect is produced such as that common in pendulum scales. The swinging of the pendulum, which is integral with the segmental gear 26, causes the shaft 16 to be rotated and the chart turned to bring the proper computation and weight graduations behind the reading line of the plate 24.

The above-described pivotal mounting of the arm 27 on the rock shaft provides for said arm swinging axially of said shaft and this means that the segmental gear 26 may swing in a direction substantially radial of the gear wheel 25. The weight 30, besides performing the function above described, also yieldingly holds said gear segment in mesh with the gear wheel 25 but preferably a special weight 31 is employed for this purpose, being adjustably mounted upon an elongated stud 32, all as shown more clearly in Fig. 2. A bracket 33 is adjustably mounted upon the base 2 with its upstanding arm in front of the lower part of the gear segment arm 27, such bracket serving the purpose of preventing unmeshing of the gears.

A counter-balancing weight 35 may be employed, adjustably mounted on a rod 36 projecting from the rock shaft 10, such weight serving to secure the necessary normal equilibrium of the scale.

It will be seen that with the segmental gear 26 extending on an arc of a comparatively large circle and the gear wheel 25 of such size as it can readily have for coöperation with the segment, there is no great multiplication of movement as to the surface of the chart, consequently the latter can be sub-divided to a great extent allowing for an unusual range of computations. It will also be seen that the arrangement of the gearing is extremely simple and lends itself to a direct application of the pendulum principle. It will furthermore be apparent that the desirable yielding engagement between the intermeshing gears is effected in a simple and reliable manner, the yielding pressure being rather radial of the gear wheel on the index shaft or in the direction of the depth of the gear teeth, than axially of such gear wheel or lengthwise of the teeth, so that there is not a wedging effect brought about by the yielding pressure but merely a tendency to directly intermesh the gears to the depth of their teeth.

The form of gearing above described and its mode of connection with the scale beam provides for multiplication of movement of the segmental gear as compared with the movement of the beam so that with the latter restricted to the preferable relatively limited range of vibration, nevertheless, a comparatively large gear can be used on the index journal with a corresponding lessening of exaggeration of any slight imperfections in the gearing when their movement is multiplied on the surface of the chart. This is explained by the fact that the eccentric disk or arm is considerably shorter than the segment gear arm and the up-and-down movement of the inner end of the beam accords with that of the shorter arm, the movement being multiplied at the extremity of the longer arm where the gear segment is located.

What is claimed is:

1. In a weighing scale, the combination of an oscillatory support, means normally holding it yieldingly to one extreme of movement, said support adapted to be moved in the opposite direction by an applied load; an index journal extending at right angles to the axis of said oscillatory support; a gear on said journal; and a gear pivotally mounted on the oscillatory support to swing toward the gear on the index journal and yieldingly held in mesh therewith.

2. In a weighing scale, the combination of an oscillatory support, means normally holding it yieldingly to one extreme of movement, said support adapted to be moved in the opposite direction by an applied load; an index journal extending at right angles to the axis of said oscillatory support; a gear on said journal; and a gear segment pivotally mounted on the oscillatory support to swing toward the gear on the index journal and yieldingly held in mesh therewith.

3. In a pendulum weighing scale, the combination of an oscillatory support, a gear pivotally mounted on said support to swing toward the gear on the index journal; a pendulum weight holding said first mentioned gear normally to one extreme of its movement opposed to an applied load; and an index journal extending at right angles to the said oscillatory support and carrying a gear with which the first-mentioned gear yieldingly engages.

4. In a pendulum weighing scale, the combination of an oscillatory support; a gear segment pivotally mounted on said support to swing toward the gear on the index journal; a pendulum weight holding said gear segment normally to one extreme of its movement opposed to an applied load; and an index journal extending at right angles to the said oscillatory support and carrying a gear with which the said gear segment yieldingly engages.

5. In a weighing scale, the combination of a pivoted beam weighted on one side of its pivot and carrying a load receiver on the opposite side of its pivot; an oscillatory support; operating connections between the same and said beam; a gear pivotally mounted on said support to swing toward the gear on the index journal; an index journal extending at right angles to the axis of said support and carrying a gear with which the first-mentioned gear yieldingly engages; and means for yieldingly holding the oscillatory support to one extreme of its movement opposed to an applied load.

6. In a weighing scale the combination of a pivoted beam weighted on one side of its pivot and carrying a load receiver on the opposite side of its pivot; an oscillatory support, operating connections between the same and said beam; a gear pivotally mounted on said support to swing toward the gear on the index journal; an index journal extending at right angles to the axis of said support and carrying a gear with which the first-mentioned gear yieldingly engages; and a pendulum weight resisting movement of the oscillatory support and its gear under an applied load.

7. In a pendulum weighing scale, the combination of a horizontally arranged beam or lever weighted on one side of its pivot and carrying a load receiver on the opposite side of its pivot; a rock shaft horizontally arranged at right angles to the beam and operatively connected therewith; a gear segment pivotally hung from said shaft to swing toward the gear on the index journal; a pendulum weight resisting movement of the rock shaft and gear segment under an applied load; and a vertical index journal carrying a gear with which the gear segment is yieldingly engaged.

ALLEN DE VILBISS, Jr.

Witnesses:
G. W. GRAHAM,
THOS. WYLIE.